(12) United States Patent
Morikawa

(10) Patent No.: US 8,205,011 B2
(45) Date of Patent: Jun. 19, 2012

(54) COMMUNICATION SYSTEM, TRANSMITTING DEVICE, RECEIVING DEVICE, AND COMMUNICATION METHOD

(75) Inventor: Yutaka Morikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 235 days.

(21) Appl. No.: 12/543,360

(22) Filed: Aug. 18, 2009

(65) Prior Publication Data

US 2010/0070651 A1     Mar. 18, 2010

(30) Foreign Application Priority Data

Sep. 18, 2008  (JP) ................................. 2008-239486

(51) Int. Cl.
*G06F 15/16*     (2006.01)
(52) U.S. Cl. ........................................ 709/247; 709/246
(58) Field of Classification Search ........... 709/246–247
See application file for complete search history.

(56) References Cited

U.S. PATENT DOCUMENTS

| | | | |
|---|---|---|---|
| 5,968,132 A | 10/1999 | Tokunaga et al. | |
| 6,804,717 B1 | 10/2004 | Bakshi et al. | |
| 7,031,259 B1 * | 4/2006 | Guttman et al. | 370/235 |
| 7,295,549 B2 * | 11/2007 | Pepin et al. | 370/352 |
| 7,342,938 B1 * | 3/2008 | Zogg et al. | 370/465 |
| 7,490,342 B2 * | 2/2009 | Echigo et al. | 725/46 |
| 7,573,826 B1 * | 8/2009 | Beshai et al. | 370/241 |
| 7,580,399 B2 * | 8/2009 | Hart | 370/338 |
| 7,602,726 B1 * | 10/2009 | Sundaresan et al. | 370/237 |
| 7,643,414 B1 * | 1/2010 | Minhazuddin | 370/230 |
| 7,688,852 B2 * | 3/2010 | Bokish et al. | 370/468 |
| 2005/0086354 A1 | 4/2005 | Orchard | |

FOREIGN PATENT DOCUMENTS

| | | |
|---|---|---|
| JP | 2002124916 A | 4/2002 |
| JP | 2004503176 A | 1/2004 |
| JP | 2006197605 A | 7/2006 |
| JP | 2007135206 A | 5/2007 |
| JP | 2007524330 A | 8/2007 |

OTHER PUBLICATIONS

European Search Report for EP 09 16 7966 completed Dec. 17, 2009.
C. N. Doukas et al, "Advanced Medical Video Services through Context—Aware Medical Networks", Engineering in Medicine and Biology Society, 2007. EMBS 2007. 29th Annual Internat10nal Conference of the IEEE, IEEE, Aug. 22, 2007, pp. 3074-3077.
M. Tian et al., "Adaptive QoS for Mobile Web Services through Cross-Layer Communication",Computer, IEEE Service Center, vol. 40, No. 2, Feb. 1, 2007, pp. 59-63.
S. Lee et al., "Admission Control for Multihop Wireless Backhaul Networks with QoS Support", Wireless Communications and Networking Conference, 2006. WCNC 2006. IEEE Apr. 3, 2006, pp. 92-97.
European Communication for EP 09 16 7966 dated Mar. 7, 2011.
C. Thejaswi et al, "Adaptive Joint Source-Channel Rae: Allocation Policies for Delay Sensitive Applications Over Fading Channels", IEEE Transactions on Information Theory, vol. 52, No. 12, Dec. 2006, pp. 5587-5598.

* cited by examiner

*Primary Examiner* — Hussein A. Elchanti

(57) ABSTRACT

A communication system includes a transmitting device and a receiving device. The transmitting device compresses input data according to quality of service assigned to the data, and transmits the compressed data. The receiving device receives the data transmitted from the transmitting device, decompresses the data according to the quality of service assigned to the data, and outputs the decompressed data.

16 Claims, 10 Drawing Sheets

Fig.3A

| QoS Type | SETTING INFORMATION ||||
| --- | --- | --- | --- | --- |
| | COMPRESSION MODE | COMPRESSION ALGORITHM | PRIORITY | DECOMPRESSION ALGORITHM |
| UGS | UNCOMPRESSION | — | 1 | — |
| rtPS | UNCOMPRESSION | — | 3 | — |
| nrtPS | COMPRESSION | COMPRESSION ALGORITHM 1 | 1 | DECOMPRESSION ALGORITHM 1 |
| ertPS | UNCOMPRESSION | — | 2 | — |
| BE | COMPRESSION | COMPRESSION ALGORITHM 2 | 2 | DECOMPRESSION ALGORITHM 2 |

3131A — QoS Type
3131B — COMPRESSION MODE
3131C — COMPRESSION ALGORITHM
3131D — PRIORITY
3131E — DECOMPRESSION ALGORITHM
3131 — SETTING INFORMATION

Fig.3B

| QoS Type | SETTING INFORMATION | | | |
|---|---|---|---|---|
| | COMPRESSION MODE | COMPRESSION ALGORITHM | PRIORITY | DECOMPRESSION ALGORITHM |
| QOS GRADE 1 | UNCOMPRESSION | — | 1 | — |
| QOS GRADE 2 | UNCOMPRESSION | — | 2 | — |
| QOS GRADE 3 | COMPRESSION | COMPRESSION ALGORITHM 1 | 1 | DECOMPRESSION ALGORITHM 1 |
| QOS GRADE 4 | COMPRESSION | COMPRESSION ALGORITHM 2 | 2 | DECOMPRESSION ALGORITHM 2 |
| QOS GRADE 5 | COMPRESSION | COMPRESSION ALGORITHM 3 | 3 | DECOMPRESSION ALGORITHM 3 |

COMMUNICATION SYSTEM, TRANSMITTING DEVICE, RECEIVING DEVICE, AND COMMUNICATION METHOD

This application is based upon and claims the benefit of priority from Japanese Patent Application No. 2008-239486 filed on Sep. 18, 2008, the content of which is incorporated by reference.

BACKGROUND OF THE INVENTION

1. Field of the Invention

The present invention relates to a technique which transmits and receives data in a communication system, and more particularly, relates to a technique which transmits and receives data in a broadband radio access system.

2. Description of the Related Art

As the transmission rate of a communication system becomes faster, the transmission capacity (band, delay) of a backhaul network through which a node such as a radio base station, DSLAM (Digital Subscriber Line Access Multiplexer) or MSAN (Multi-Service Access Node) connects to a core network comes to influence the performance of the entire network. While voice communication only requires lease of a few dedicated lines of 1.5 Mbps (Megabit per second) or 2 Mbps, broadband communication cannot be accommodated by that and requires many dedicated lines. Accordingly, the use of dedicated lines in broadband communication system raises running costs, adversely affecting business of communications carriers. It is difficult to secure large transmission capacity for broadband access due to constraints of the frequency band, the channel band and the like which can be used even when a backhaul is constructed using microwave communication devices which communicate in a point-to-point fashion without dedicated lines.

Typically, these microwave communication devices transparently transmit every signal from a BS (Base Station). However, according to this, redundant data may be intermingled in traffic, thereby reducing transmission efficiency.

In particular, since a backhaul from a BS to a core network which is used for broadband access requires a wide band to be secured, construction of an economical network requires transmission without waste.

In order to improve transmission efficiency, for example, a technique disclosed in Japanese Patent Laid-Open No. 2002-124916 (hereinafter referred to as Patent Document 1) increases resources by using a combination of radio bands different from each other in terms of uplink and downlink.

Japanese Patent Laid-Open Nos. 2006-197605 and 2007-135206, and National Publication of International Patent Application No. 2007-524330 (hereinafter referred to as Patent Documents 2 to 4, respectively) disclose techniques which dynamically change backhaul resources. National Publication of International Patent Application No. 2004-503176 (hereinafter referred to as Patent Document 5) discloses a technique which changes a parameter for setting quality of service to be secured.

However, the techniques that are described in Patent Documents 1 to 4, while improving the transmission efficiency by increasing the resources, require costs for increasing the resources.

On the other hand, while the technique that are described in Patent Document 5 accommodates the increase of traffic by changing the quality of service, it is impossible to improve the transmission efficiency with the changed quality of service.

Thus, according to the techniques that are described in Patent Documents 1 to 5, there are problems in that it is difficult to improve the transmission efficiency while restricting increase in cost.

SUMMARY OF THE INVENTION

An exemplary object of the present invention is to provide a technique which improves transmission efficiency at low cost in a communication system.

To achieve the object, a communication system according to the present invention comprising: a transmitting device which compresses input data according to quality of service assigned to the data and transmits the compressed data; and a receiving device which receives the data transmitted from the transmitting device, decompresses the data according to the quality of service assigned to the data and outputs the decompressed data.

A transmitting device according to the present invention comprises: compression means for compressing input data according to quality of service assigned to the data; and transmission means for transmitting the data compressed by the compression means.

A receiving device according to the present invention comprises: reception means for receiving data to which quality of service is assigned; decompression means for decompressing the data received by the reception means according to the quality of service assigned to the data; and output means for outputting data decompressed by the decompression means.

A communication method according to the present invention comprises: compressing input data according to the quality of service assigned to the data; transferring the compressed data from a transmitting device to a receiving device; decompressing the data received by the receiving device according to the quality of service; and outputting the decompressed data.

The above and other objects, features, and advantages of the present invention will become apparent from the following description with references to the accompanying drawings which illustrate examples of the present invention.

BRIEF DESCRIPTION OF THE DRAWINGS

FIG. 3A illustrates setting information;

FIG. 3B illustrates the setting information;

DETAILED DESCRIPTION OF THE PREFERRED EMBODIMENTS

An exemplary embodiment will be described in detail with reference to the accompanying drawings.

Figure 1:
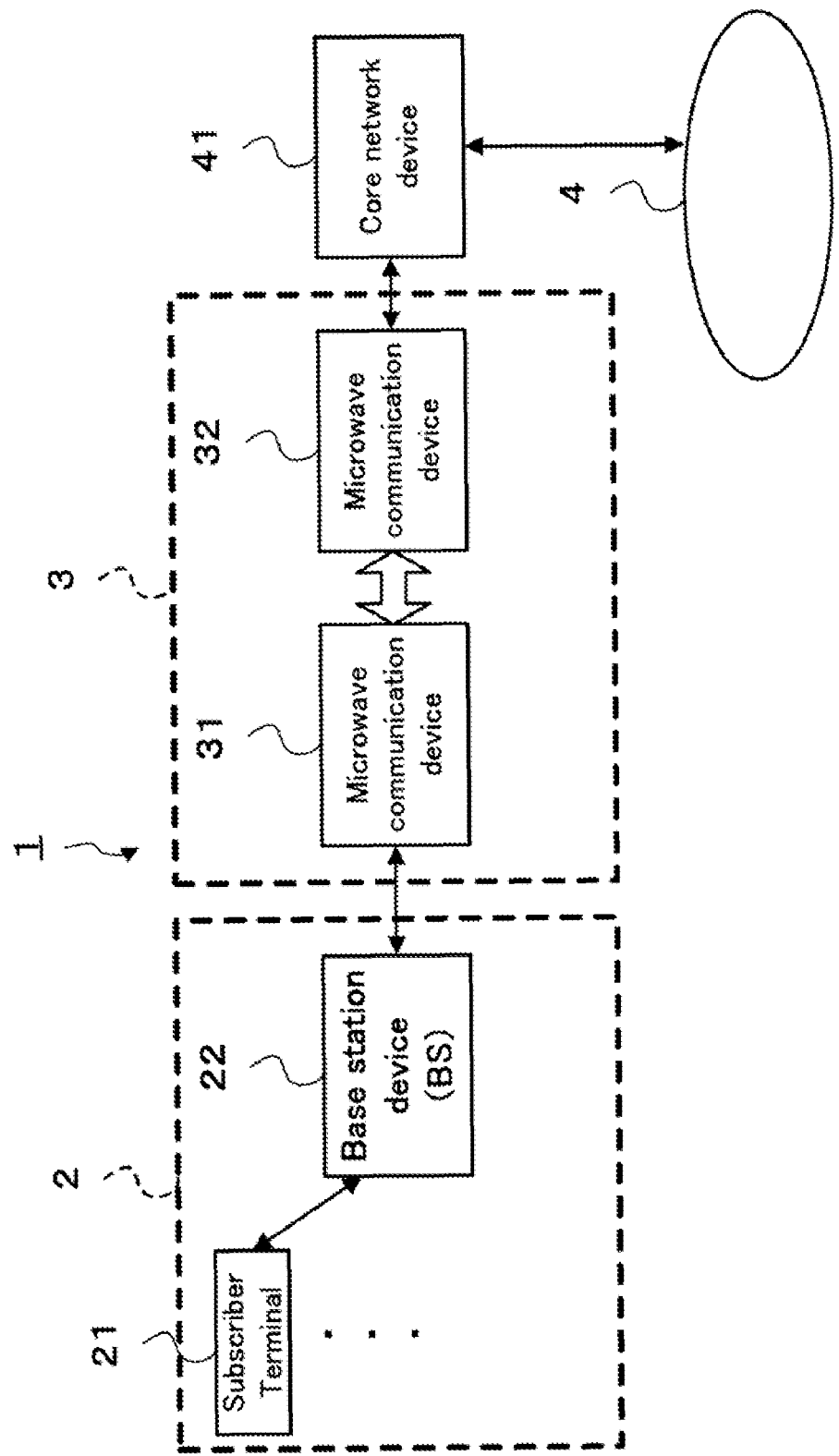
FIG. 1 is an overall view of a communication system according to an exemplary embodiment.

FIG. 1 is an overall view of communication system 1 according to an exemplary embodiment. Communication system 1 is, for example, a broadband radio access system adopting the mobile WiMAX (Worldwide Interoperability for Microwave Access) standard. It should be noted that communication system 1 is not restricted to adopt mobile WiMAX, but it may adopt fixed WiMAX or portable WiMAX.

Instead, communication system I may be a communication system adopting a PASOLINK, HSDPA (High Speed Download Packet Access)/HSUPA (High Speed Uplink Packet Access) or LTE (Long Term Evolution) standard instead of WiMAXs.

Referring to FIG. 1, communication system 1 includes radio access network 2, backhaul network 3, and core network 4.

Radio access network 2 is a communication network connecting each subscriber terminal and a base station. In radio access network 2, base station device 22 accommodates subscriber terminals 21. Subscriber terminal 21 is, for example, a communication terminal such as a cellular phone or a PCM-CIA (Personal Computer Memory Card International Association) card of a personal computer. Base station device 22 controls access of subscriber terminal 21 to a broadband network.

Backhaul network 3 is a communication network connecting base station device 22 and core network 4. Backhaul network 3 includes microwave communication devices 31 and 32. Microwave communication devices 31 and 32, by communicating with each other using PPP (Point to Point Protocol), connect radio access network 2 and core network 4.

Core network 4 uses large capacity lines, and is a communication network that will be the center of communication system 1. For example, an IP (Internet Protocol) network is used as core network 4. Core network 4 includes core network devices (for example, 41) connected to one another. Core network device 41 shown in FIG. 1 also operates as, for example, an ASN (Active Service Network) gateway, and controls connection from microwave communication device 32 to core network 4.

In above-mentioned radio access network 2 and core network 4, uncompressed data is transmitted and received. On the other hand, in backhaul network 3, compressed data or uncompressed data is transmitted and received according to quality of service. In FIG. 1, normal arrows represent uncompressed data transmission and reception, and an arrow outline with a blank inside represents data transmission and reception including compressed data. Details on compression processing will be described later.

Thus, control by base station device 22, microwave communication devices 31 and 32, and core network device 41 allows subscriber terminal 21 to access core network 4.

Figure 2:
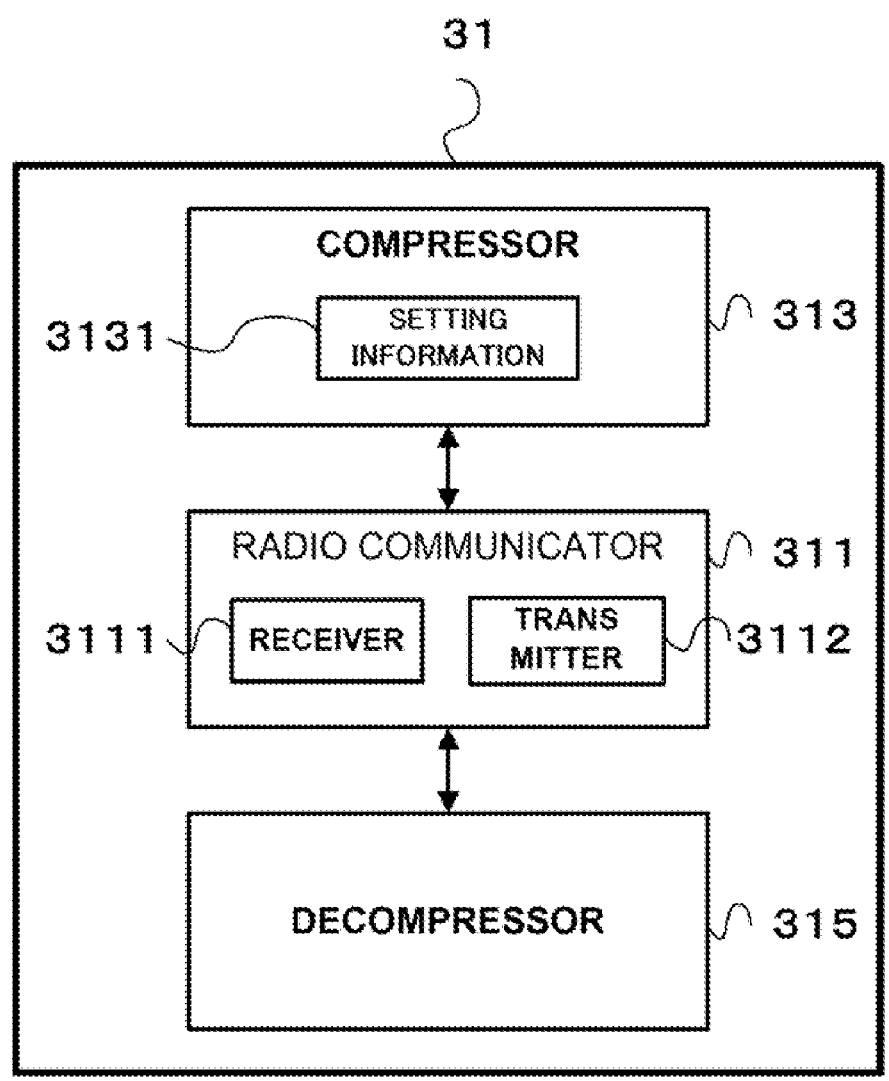
FIG. 2 is a block diagram of a microwave communication device according to the exemplary embodiment.

FIG. 2 is a block diagram showing a configuration of microwave communication device 31. Referring to this figure, microwave communication device 31 includes radio communicator 311, compressor 313, and decompressor 315.

Radio communicator 311 includes receiver 3111 and transmitter 3112. Receiver 3111 receives data stored in a packet from base station device 22 or microwave communication device 32 through radio access network 2 or backhaul network 3. Transmitter 3112 executes cue control on a packet, and transmits according to priority of the packet. Setting of the priority will be described later.

Compressor 313 contains setting information 3131, and compresses uplink data in data stored in the packet, which has been received by base station device 22, according to QoS (Quality of Service) of the network. Here, the uplink data is data transmitted from radio access network 2 to core network 4, or data which microwave communication device 31 receives from base station device 22. On the other hand, down link data is data transmitted from core network 4 to radio access network 2, in other words, data which microwave communication device 31 transmits to base station device 22.

This compressed data is transmitted through backhaul network 3 by transmitter 3112 to microwave communication device 32. Thus, the compressed data is transmitted and received, thereby reducing traffic in backhaul network 3.

Compressor 313 in compression processing, to begin with, acquires QoS in the network.

The WiMAX standards, for example, have five types of QoS: UGS (Unsolicited Grant Service), rtPS (real-time Polling Service), nrtPS (non-real-time Polling Service), ertPS (extended real-time Polling Service) and BE (Best Effort). Instead, an administrator may determine arbitrary type of QoS.

QoS is set in core network device 41 on each user or an application. In backhaul network 3, VLANs (Virtual Local Area Networks) are configured according to a session generated on each user or each application. QoS is assigned on each VLAN.

A parameter indicating the type of QoS in each VLAN is inserted into a packet header by base station device 22 or the like. Compressor 313 acquires the type of QoS in each VLAN by reading the parameter.

A configuration according to which microwave communication device 31 preliminarily contains a table relating VLANs and QoS and the device 31 acquires the QoS corresponding to VLAN may be adopted instead of addition of information indicating the QoS to a packet. An administrator of microwave communication device 31 may manually enter QoS on each VLAN. A configuration according to which the parameter that indicates QoS on each VLAN is received from another communication device such as core network device 41 can be adopted.

A compression method will be described with reference to FIGS. 3A and 3B. FIGS. 3A and 3B are diagrams showing configurations of setting information 3131 stored in compressor 313. Setting information 3131 is information indicating a compression system, priority, and decompression algorithm setting in the network. The compression system includes a compression mode and a compression algorithm. Referring to FIGS. 3A and 3B, there are set information indicating relationships between QoS type 3131A and compression mode 3131B, compression algorithm 3131C, priority 3131D and decompression algorithm 3131E in setting information 3131.

QoS type 3131A is information indicating the type of QoS. Compression mode 3131B is information indicating whether received data is to be compressed or not. When data corresponding to the QoS concerned is to be compressed, "compression" is assigned. Otherwise, "uncompression" is assigned. Compression algorithm 3131C is an algorithm used when received data is compressed. Priority 3131D determines priority in a transmission schedule on each packet that stores compressed data and on each packet that stores uncompressed data with respect to the type of QoS. For example, the higher the priority in the packet transmission schedule, the lower is the number that is assigned. Decompression algorithm 3131E is an algorithm for decompressing data having been compressed by compression algorithm 3131C.

FIG. 3B is an example of setting information 3131 setting compression mode 3131B and the like in relation to QoS grades 1 to 5 (3131A) which the administrator has arbitrarily determined. FIG. 3A is an example of setting information 3131 setting compression mode 3131B and the like corresponding to QoS in WiMAX, or UGS, rtPS, nrtPS, ertPS and BE (3131A).

As for setting of compression mode 3131B, it is determined whether data is compressed or not based on transmission delay characteristics prescribed by the QoS. The QoS prescribes, on a type-by-type basis, maximum delay time and setting values of delay jitter allowable in a network. For example, microwave communication device 31 compresses the data when the maximum delay time ensured by the QoS is equal to or greater than a prescribed value. It may be determined whether compression is executed or not based on the setting value of delay jitter instead of or in addition to the maximum delay time. Information indicating the maximum delay time and/or the setting value of delay jitter on each type of QoS is preliminarily entered into microwave communication device 31 or received from core network device 41 or the like by microwave communication device 31.

Referring to FIG. 3B, UGS, rtPS and ertPS are delay time oriented QoS types, on which compression mode 3131B is accordingly assigned with "uncompression". On the other hand, compression mode 3131B is assigned "compression" on nrtPS and BE, in which transmission delay is allowed. In a case of uncompressed transmission, since priority of packet transmission should be arranged in descending order: UGS, ertPS and rtPS, priority 3131C concerning UGS, ertPS and rtPS are assigned "priority 1", "priority 2" and "priority 3", respectively. In a case of compressed transmission, since nrtPS should be set higher in priority than BE, "priority 1" and "priority 2" are set on nrtPS and BE, respectively.

Setting information 3131 shown in FIGS. 3A and 3B may be assigned by core network device 41 and then received by microwave communication device 31 or entered by the administrator of microwave communication device 31. Setting information 3131 having been transmitted by core network device 41 to base station device 22 can then be received by microwave communication device 31 from base station device 22. Administrators of base station device 22, microwave communication devices 31 and 32, and core network device 41 may modify the content that have already been set.

Compressor 313 reads compression system (compression mode 3131B and compression algorithm 3131C) corresponding to acquired QoS type 3131A from setting information 3131, and compresses the data received according to the read compression system.

Returning to FIG. 2, transmitter 3112 executes cue control on a packet, and transmits data that have been compressed by compressor 313 or uncompressed data.

When receiving a downlink packet from microwave communication device 32, decompressor 315 judges whether the data stored in the received packet is compressed or not. In a case of compression, decompressor 315 decompresses the data.

Decompressor 315 judges whether the data stored in the received packet is compressed or not by detecting compression bits from a packet header of the received packet. When the data is compressed, compressor 315 reads decompression algorithm 3131E corresponding to QoS type 3131A from setting information 3131, and decompresses the compressed data using the read algorithm. Transmitter 3112 transmits the data decompressed by decompressor 315.

As another example, a configuration where microwave communication device 32 does not insert compression bits and decompressor 315 judges whether or not it executes decompression based on the type of QoS may be adopted. For example, when the type of QoS is nrPS or BE, decompressor 315 decompresses the received data.

As still another example, a configuration where microwave communication device 32 inserts information that indicates a decompression algorithm into the header of a packet that stores compressed data and where decompressor 315 determines the decompression algorithm by reading the information from the header may be adopted.

Thus, microwave radio communication device 31 receives the uplink data from base station device 22, compresses the data according to the type of QoS in the network, and transmits the compressed data to microwave communication device 32. This reduces communication traffic between microwave radio communication devices 31 and 32, thereby increasing transmission efficiency in backhaul network 3.

Figure 4:
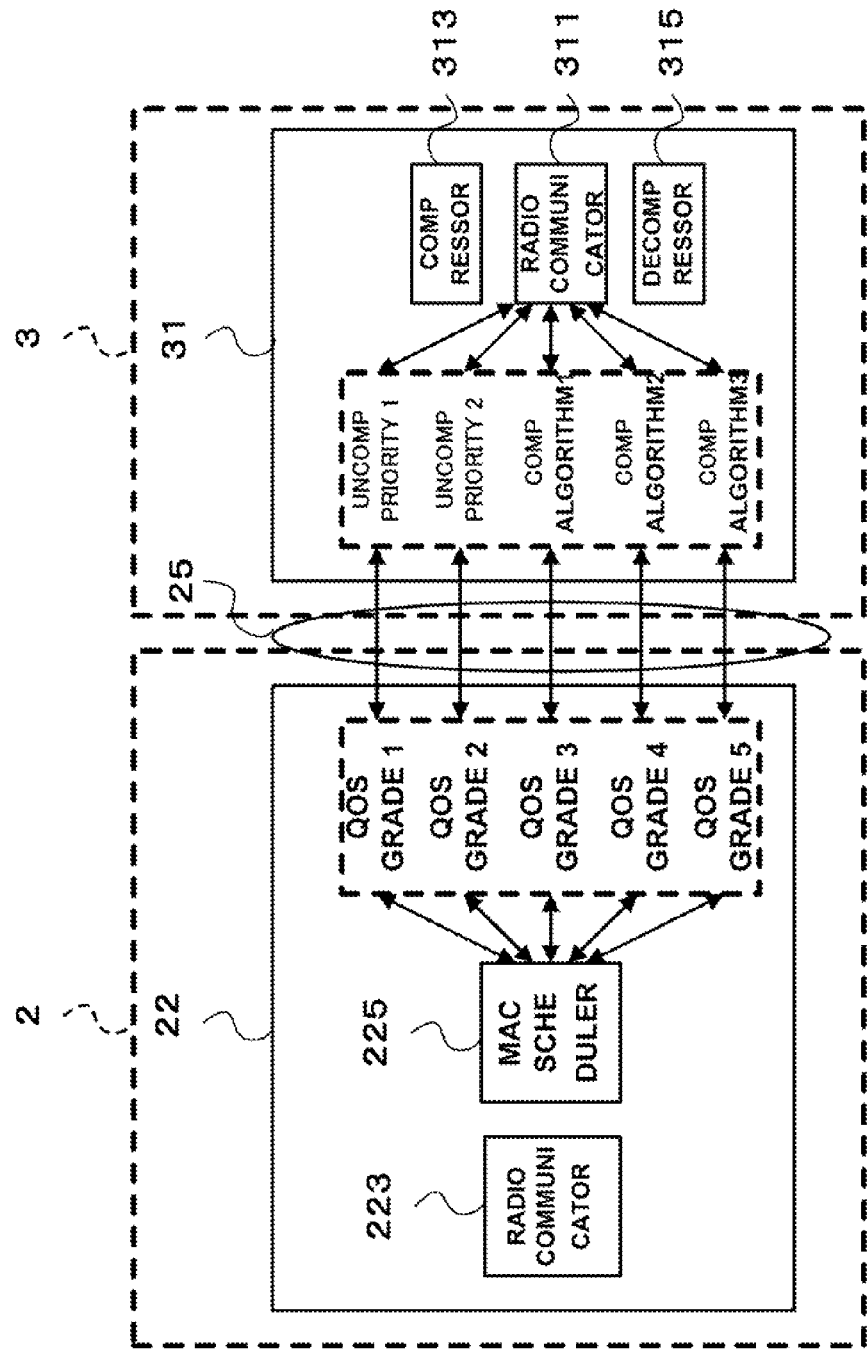
FIG. 4 is a block diagram of a base station device and the microwave communication device according to the exemplary embodiment.

Next, base station device 22 will be described with reference to FIG. 4. FIG. 4 is a block diagram showing configurations of base station device 22 and microwave communication device 31. Referring to the figure, base station device 22 includes radio communicator 223 and MAC scheduler 225. The configuration of microwave communication device 31 is substantially identical to that shown in FIG. 2. There is constructed VLAN 25 between base station device 22 and microwave communication device 31.

Radio communicator 223 transmits and receives data on a packet basis to and from subscriber terminals 21 through radio access network 2. MAC scheduler 225 executes cue control on a packet, and transmits and receives the data stored in the packet to and from microwave communication device 31 through VLAN 25.

VLAN 25 is virtual networks established between base station device 22 and microwave communication device 31. For example, base station device 22 and microwave communication device 31 are caused to belong to different VLANs on a session basis. Referring to FIG. 4, there are constructed at least five VLANs in VLAN 25. The VLANs are individually assigned with QoS from "QoS grades 1 to 5".

According to the above-mentioned configuration, base station device 22 transmits and receives data to and from subscriber terminal 21 and microwave communication device 31.

Figure 5:
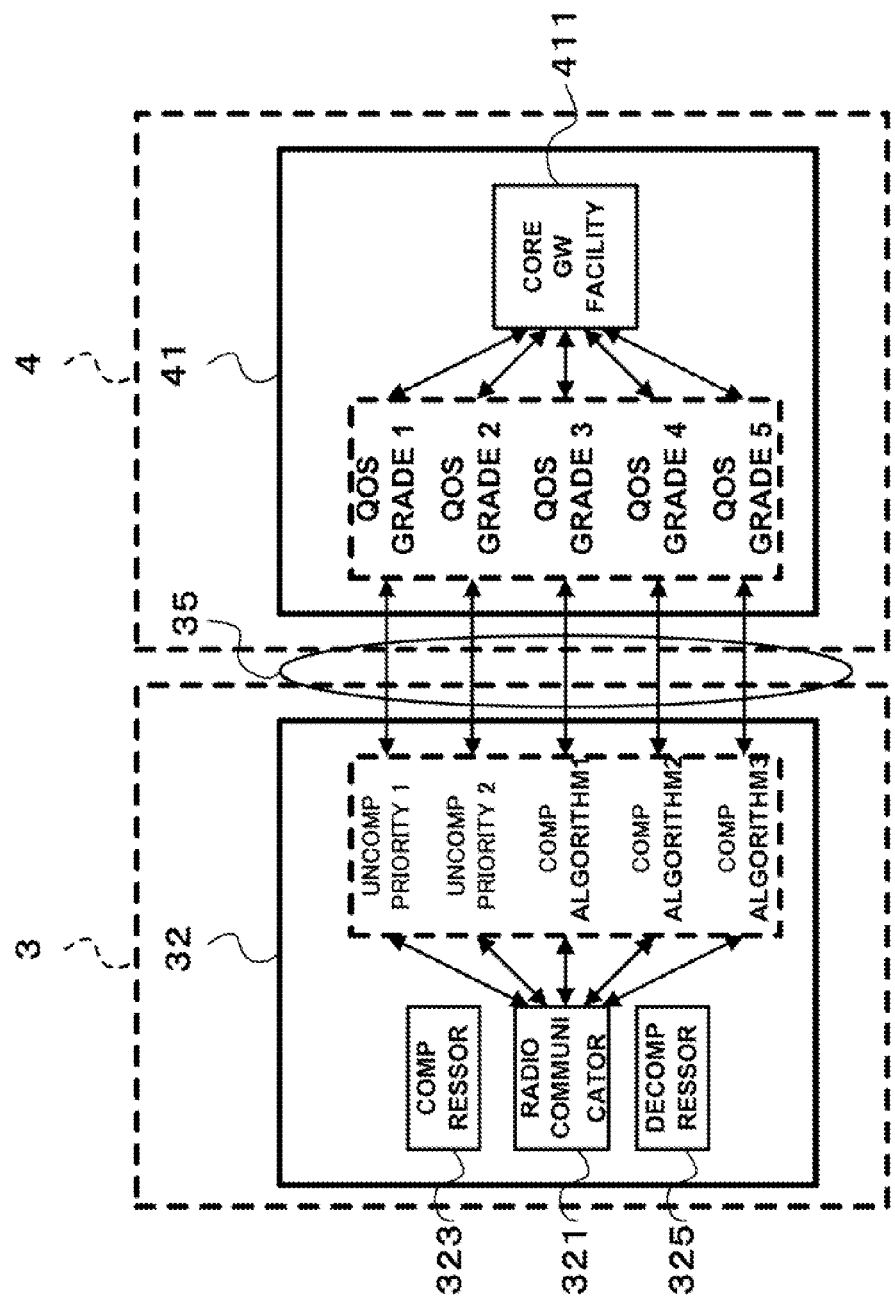
FIG. 5 is a block diagram of the microwave communication device and a core network device according to the exemplary embodiment.

Microwave communication device 32 and core network device 41 will be described with reference to FIG. 5. FIG. 5 is a block diagram showing configurations of core network device 41 and microwave communication device 32. Referring to the figure, core network device 41 includes core GW facility 411. Microwave communication device 32 includes radio communicator 321, compressor 323, and decompressor 325. There is constructed VLAN 35 between core network device 41 and microwave communication device 32.

Configurations of radio communicator 321, compressor 323 and decompressor 325 in microwave communication device 32 are substantially identical to those of radio communicator 311, compressor 313 and decompressor 315 in microwave communication device 31 shown in FIG. 2, respectively.

It should be noted that microwave communication device 32 compresses the downlink data received from core network device 41 and decompresses the uplink data received from microwave communication device 31.

VLAN 35 is virtual networks established between microwave communication device 32 and core network device 41.

Core GW facility 411 includes a gateway facility which controls connection of microwave communication device 32 in backhaul network 3 to core network 4.

According to the above-mentioned configuration, microwave communication device 32 and core network device 41 transmits and receives data through networks (3 and 4).

According to this exemplary embodiment, microwave communication device 31, having received the data (uplink data) from base station device 22 compresses the received data according to the QoS in the VLAN, and transmits the compressed data. Microwave communication device 32 receives and decompresses the compressed data, and transmits the decompressed data to core network device 41.

On the other hand, microwave communication device 32, having received the data (downlink data) from core network device 41, compresses the received data according to the QoS in the VLAN, and transmits the compressed data. Microwave communication device 31 receives and decompresses the compressed data, and transmits the decompressed data to base station device 22.

Thus, the compressed data is transmitted and received between microwave communication device 31 and microwave communication device 32. This reduces communication traffic in backhaul network 3, thereby improving communication efficiency in communication system 1. Furthermore, since communication system 1 according to this exemplary embodiment does not increase the resources themselves, it is economical. Moreover, since the compressed data is decompressed in communication devices (31 and 32) at the exit of backhaul network 3, backhaul network 3 becomes transparent from the standpoint of radio access network 2 and core network 4.

Figure 6:
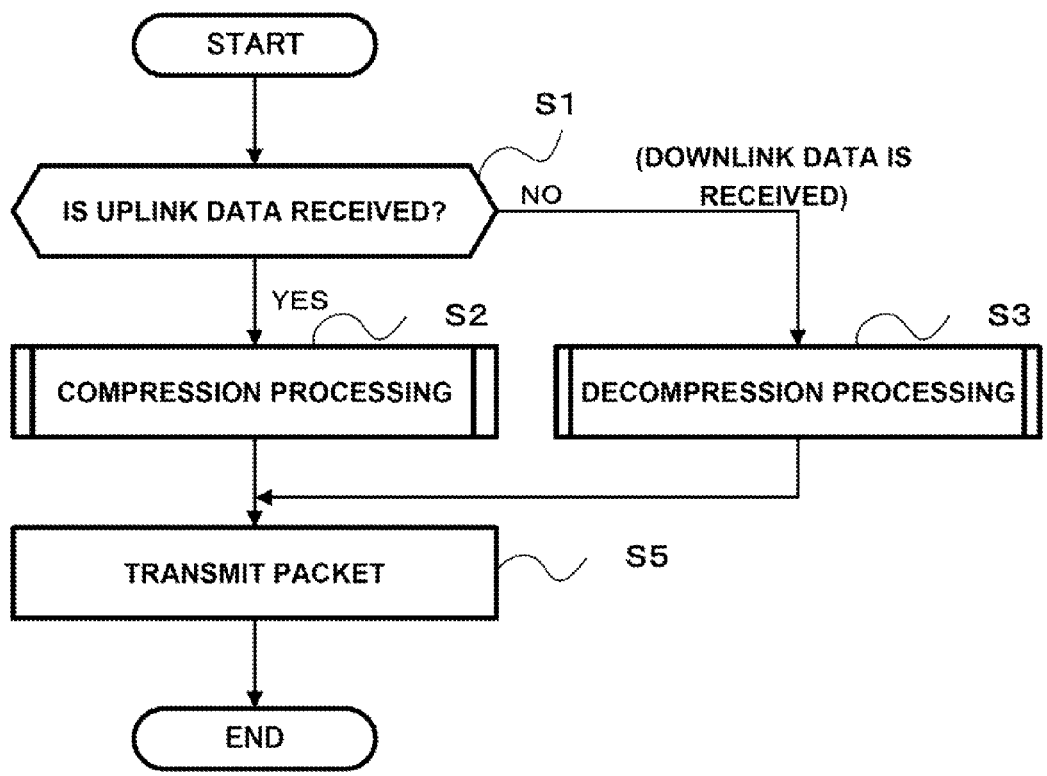
FIG. 6 is a flowchart showing an operation of microwave communication processing according to the exemplary embodiment.
Figure 7:
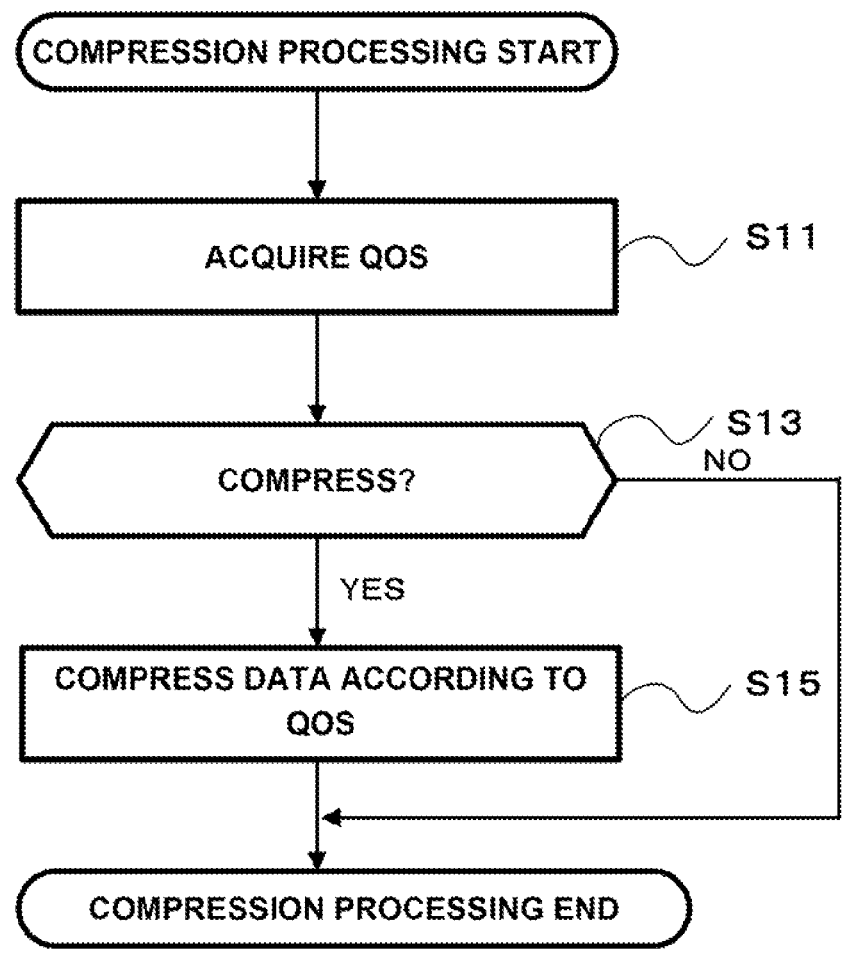
FIG. 7 is a flowchart showing compression processing according to the exemplary embodiment.

An operation of microwave communication device 31 will be described with reference to FIGS. 6 to 8. FIG. 6 is a flowchart showing communication processing of microwave communication device 31. This communication processing is processing which microwave communication device 31 executes for transmitting data, and starts when microwave communication device 31 receives the data from base station device 22 or microwave communication device 32.

Referring to FIG. 6, microwave communication device 31 judges whether the data that has been received by receiver 3111 is uplink data or not (step S1). When the data is the uplink data (step S1: YES), compressor 313 executes compression processing (step S2). When the data is not the uplink data, in other words the data is downlink data (step S1: NO), decompressor 315 executes decompression processing (step S3). After step S2 or S3, radio communicator 311 transmits the compressed data or decompressed data on a packet basis. At this time, transmitter 3112 inserts compression bits indicating that compression has been executed into the packet header of a packet storing the compressed data (step S4).

The compression processing will be described with reference to FIG. 7. FIG. 7 is a flowchart showing compression processing in compressor 313. Compressor 313 acquires the type of QoS in the VLAN (step S11). Compressor 313 reads compression mode 3131B corresponding to the type of QoS from setting information 3131, and judges whether it compress the data or not (step S13). When compressing the data (step S13: YES), compressor 313 reads compression algorithm 3131C corresponding to the type of QoS from setting information 3131, and compresses the data to be transmitted using the read compression algorithm (step S15). When not compressing the data (step S13: NO) or after step S15, compressor 313 finishes the compression processing.

Decompression processing will be described with reference to FIG. 8. The figure shows processing according to which compressor 315 decompresses the compressed data.

Figure 8:
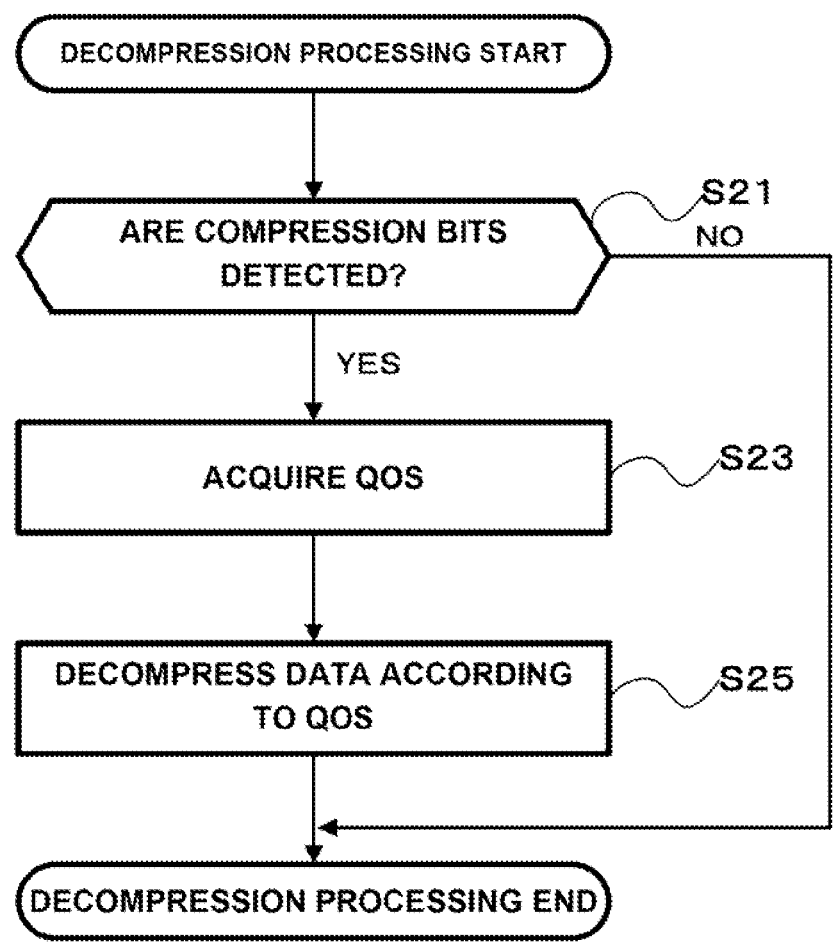
FIG. 8 is a flowchart showing decompression processing according to the exemplary embodiment.

Referring to FIG. 8, decompressor 315 judges whether the packet header of the received packet includes the compression bit or not (step S21). When the compression bits are detected (step S21: YES), decompressor 315 acquires the type of QoS in the VLAN (step S23). Decompressor 315 extracts the compressed data from the packet, and reads decompression algorithm 3131E corresponding to the type of QoS form setting information 3131. Compressor 315 then decompresses the data using the read decompression algorithm (step S25). When the compression bits are not detected (step S21: NO), decompressor 315 finishes the decompression processing.

As described with reference to FIGS. 6 to 8, microwave communication device 31 compresses the uplink data being transmitted from radio access network 2 to core network 4, and decompresses the downlink data being transmitted from core network 4 to radio access network 2.

On the other hand, the operation of microwave communication device 32 is substantially identical to that of microwave communication device 31 except that the uplink data being transmitted from radio access network 2 to core network 4 is decompressed and the downlink data being transmitted from core network 4 to radio access network 2 is compressed.

It should be noted that base station device 22 and/or core network device 41 may have configurations substantially identical to those of microwave communication device 31 and 32 and allow improvement of communication traffic efficiency of radio access network 2 and/or core network 4. A configuration where another communication device such as a router and/or a gateway of radio access network 2 and/or core network 4, other than base station device 22 or core network device 41, execute compression processing and decompression processing may also be adopted.

As for setting information shown in FIGS. 3A and 3B, a configuration where setting information 3131 is automatically created on a session basis by executing a computer program instead of reading the preliminarily stored setting information 3131 may also be adopted.

The whole or a part of the processing shown in FIGS. 4 to 6 can be executed according to a computer program.

In the above-mentioned exemplary embodiment, the present invention is applied to a radio-based backhaul system. However, if the bandwidth is restricted, even wire-based networks such as ADS (Asymmetric Digital Subscriber Line) and FTTH (Fiber To The Home) allow efficient transmission at low cost by applying the present invention.

Figure 9:
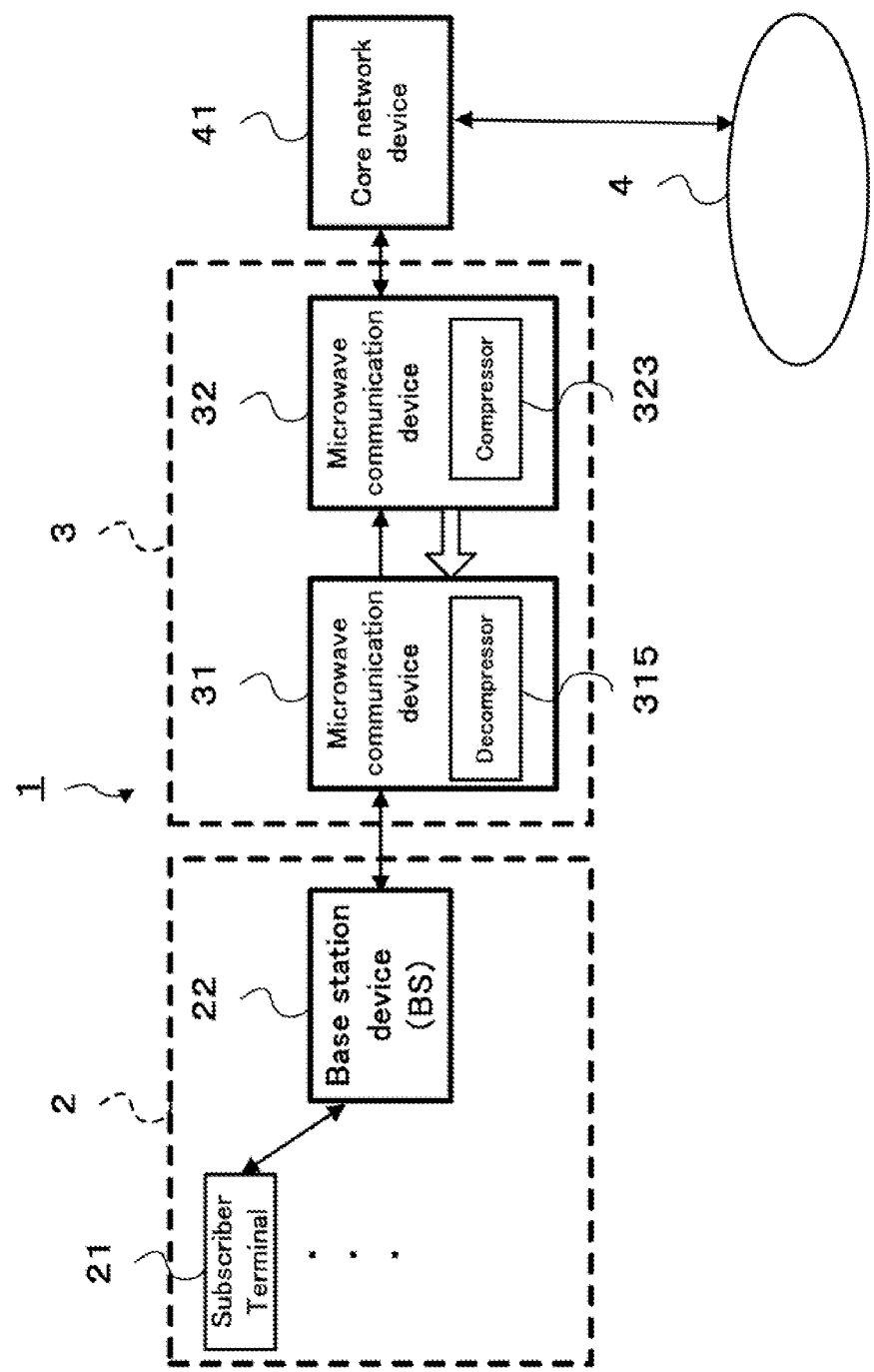
FIG. 9 is an overall view of a communication system according to a modification.

As shown in FIG. 9, only one of uplink data and downlink data may be compressed. Referring to the figure, microwave communication device 31 includes decompressor 315, while not including compressor 313. Microwave communication device 32 includes compressor 323, while not including decompressor 325. This configuration only compresses the downlink data with relatively heavy traffic, thereby allowing improvement of transmission efficiency at lower cost. In the figure, an arrow outline with a blank inside represents transmission and reception of data including compressed data.

While preferred exemplary embodiments of the present invention have been described using specific terms, such description is for illustrative purposes only, and it is to be understood that changes and variations may be made without departing from the spirit or scope of the following claims.

What is claimed is:

1. A communication system comprising:
   a transmitting device which compresses input data according to quality of service assigned to the input data and transmits the compressed data; and
   a receiving device which receives the compressed data transmitted from the transmitting device, decompresses the compressed data according to the quality of service assigned to the input data and outputs decompressed data, wherein
   the transmitting device determines, on the basis of the quality of service assigned to the input data, a compression algorithm used for compression of the input data and the transmitting device compresses the input data using the determined compression algorithm, the transmitting device adds compression information indicating that the input data is compressed to the compressed data, and transmits the compressed data to which the compression information is added.

2. The communication system according to claim 1, wherein the transmitting device compresses the input data on the basis of transmission delay characteristics prescribed by the quality of service assigned to the input data.

3. The communication system according to claim 2, wherein
the quality of service is selected from UGS, rtPS, nrtPS, ertPS and BE, and
the transmitting device compresses the data only when the data to which nrtPS or BE is assigned is input.

4. The communication system according to claim 1, wherein the transmitting device preliminarily stores compression algorithm information indicating the compression algorithm used for compression of the data in relation to the quality of service, and determines the compression algorithm used for compression of the data on the basis of the compression algorithm information corresponding to the quality of service assigned to the input data.

5. The communication system according to claims 1, wherein the transmitting device compresses the input data according to the quality of service assigned to the input data, determines priority in transmission of the compressed data according to the quality of service, and transmits the compressed data according to the determined priority.

6. The communication system according to claim 5, wherein the transmitting device preliminarily stores priority information indicating the priority in transmission of the compressed data in relation to the quality of service, and determines the priority in transmission of the compressed data on the basis of the priority information corresponding to the quality of service.

7. The communication system according to claims 1 wherein the communication system is used for a backhaul network that connects a radio access network and a core network to each other.

8. The communication system according to claim 7, wherein the transmitting device and the receiving device are opposed each other in a point-to-point fashion between the radio access network and the core network, and transmit and receive the data.

9. A transmitting device comprising:
hardware;
a compressor to compress input data according to quality of service assigned to the input data; and
a transmitter to transmit the compressed data compressed by the compressor, wherein:
one or more of the compressor and the transmitter are implemented via the hardware,
the compressor is to determine, on the basis of the quality of service assigned to the input data a compression algorithm used for compression of the input data and the compressor is to compress the input data using the determined compression algorithm,
the compressor is to add compression information indicating that the input data is compressed to the compressed data, and the transmitter is to transmit the compressed data to which the compression information is added.

10. The transmitting device according to claim 9, wherein the compressor compresses the input data on the basis of transmission delay characteristics prescribed by the quality of service assigned to the input data.

11. The transmitting device according to claim 10, wherein
the quality of service is selected from UGS, rtPS, nrtPS, ertPS and BE, and
the compressor compresses the data only when the data to which nrtPS or BE is assigned is input.

12. The transmitting device according to claim 9, further comprising
an algorithm storage unit storing compression algorithm information indicating the compression algorithm used for compression of the data in relation to the quality of service, wherein
the compressor reads the compression algorithm information corresponding to the quality of service assigned to the input data from the algorithm storage, and determines the compression algorithm used for compression of the data on the basis of the read compression algorithm information.

13. The transmitting device according to claims 9, wherein the transmitter determines priority in transmission of the data compressed by the compressor according to the quality of service assigned to the input data, and transmits the data compressed by the compressor according to the determined priority.

14. The transmitting device according to claim 13, further comprising
a priority storage unit storing priority information indicating the priority in transmission of the compressed data in relation to the quality of service, wherein
the transmitter reads the priority information corresponding to the quality of service assigned to the input data from the priority storage unit, and determines the priority in transmission of the data compressed by the compressor on the basis of the priority information.

15. A communication method comprising:
compressing input data according to quality of service assigned to the input data, including determining, on the basis of the quality of service assigned to the input data, a compression algorithm used for compression of the input data;
adding compression information indicating that the input data is compressed to a compressed data;
transferring the compressed data from a transmitting device to a receiving device, the compressed data transmitted including the compression information;
decompressing the compressed data received by the receiving device according to the quality of service; and outputting the decompressed data.

16. A transmitting device comprising:
compression means for compressing input data according to quality of service assigned to the input data; and
transmission means for transmitting the input data compressed by the compression means, wherein:
the compression means is further for determining, on the basis of the quality of service assigned to the input data, a compression algorithm used for compression of the input data and the compression means is further for compressing the input data using the determined compression algorithm,
the compression means is further for adding compression information indicating that the input data is compressed to a compressed data, and the transmission means is further for transmitting the compressed data to which the compression information is added.

* * * * *